3,301,797
LINEAR TRIAZINE POLYMERS
Arnold Drucker, Wilton, Conn., and Alwyn Senior, Cincinnati, Ohio, assignors to American Cyanamid Company, Stamford, Conn., a corporation of Maine
No Drawing. Filed Mar. 6, 1964, Ser. No. 350,074
6 Claims. (Cl. 260—2)

This invention relates to a novel process for the production of thermoplastic molding resins. More particularly, this invention relates to a novel process for the production of thermoplastic molding resins which comprises interfacially condensing a 2,4-dihalo-1,3,5-triazine with a diamine under various reaction conditions. Still more particularly, this invention relates to a novel group of thermoplastic molding resins.

A search for methods for the production of linear polymers which contain the s-triazine ring in the backbone has been continually and widely conducted. None of these investigations have, to our knowledge, resulted in the production of high yields of high molecular weight, linear thermoplastic polymer. Various methods which have been attempted have been the transesterification of alkoxy-s-triazines with various glycols, Dudley et al., J. Am. Chem. Soc., 73, 2999, 1961; the solution condensation of 2-alkyl-4,6-bis-trichloromethyl-1,3,5-triazines with α,ω-alkylene-diamines, U.S. Patent No. 2,884,383; and the melt condensation of 2,4-diamino-6-alkyl-1,3,5-triazines with the hydro-halide salts of alkylene diamines, U.S. Patent No. 2,723,244. In the first case, only oligomers were produced, i.e. low molecular weight polymers, while the second high temperature process resulted in polymers having molecular weight of only from about 1500–2500. The third procedure was also a high temperature process subject to all the difficulties indicative of this type of system.

We have now discovered a novel process for the production of high molecular weight holding resins possessing a linear backbone containing the s-triazine ring which process is carried out at low temperatures. Additionally, our novel process eliminates the necessity for the use of exact stoichiometric amounts of reactants, can be carried out without the necessity of highly pure reactants, and results in a high rate of polymer production. In regard to prior art solution and bulk procedures, our process results in higher yields and higher molecular weight polymers. The polymers are long chain, tough, moldable materials which are very easily molded, and can be methylolated and cured or cross-linked by the application of heat.

It is therefore an object of the present invention to provide a novel process for the production of thermoplastic molding resins.

It is a further object of the present invention to provide a novel process for the production of thermoplastic, linear, high molecular weight molding resins which comprises interfacially condensing a 2,4-dihalo-1,3,5-triazine with a diamine under various critical reaction conditions.

It is still a further object of the present invention to provide a novel group of linear, high molecular weight, thermoplastic molding resins.

These and other objects of the present invention will become more apparent to those skilled in the art upon reading the more detailed descriptions set forth hereinbelow.

THE NOVEL METHOD

The novel method of the present invention resides in interfacially condensing a solution of a compound having the formula (I)
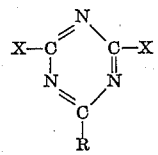

wherein X is bromine, chlorine or iodine and R is an alkyl ($C_1$–$C_4$), an alkoxy ($C_1$–$C_4$), an aryl ($C_6$–$C_{10}$) an aryloxy ($C_6$–$C_{10}$) or an allyloxy radical, with at least an equal molar amount of an aqueous solution of a diamine having the formula (II)
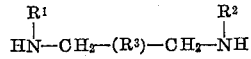

wherein $R^1$ and $R^2$ are individually hydrogen, or alkyl ($C_1$–$C_4$) radicals, and $R^3$ is an alkenylene radical ($C_2$–$C_7$), a $(CH_2)_n$ group wherein $n$ is 0–7, an arylene radical ($C_6$–$C_{10}$) or an alkylidene ($C_3$–$C_5$) radical.

The reaction is conducted interfacially in the presence of a slight molar excess, over the triazine reactant, of a basic acid acceptor and at a temperature ranging from about 0° C. to about 100° C., preferably about 20° C. to about 85° C., at atmospheric pressure. Superatmospheric or subatmospheric pressures may be used, however, if desired or necessary. Examples of acid acceptors which may be used include sodium hydroxide, potassium hydroxide, and the like. Other known acceptors may also be used without departing from the scope of the instant invention.

The concentration of the triazine in solution ranges from about 0.1 to 1.0 molar, while the concentration of the diamine in water is generally within substantially the same range. The molar ratio of triazine to diamine, however, ranges from about 1:1 to about 1:5, respectively. Higher amounts of diamine may be used if desired, however, lower amounts of diamine materially decrease the yield and molecular weight of the resultant polymer.

The time of contact of the reactants is not critical except that generally the longer the reaction is allowed to continue, the higher the molecular weight. Generally, we have found that from about one-half hour to about 100 hours, preferably 2 hours to 24 hours, is sufficient.

Any inert, water-immiscible solvent may be used to form the triazine phase of the system, with such compounds as the aromatic hydrocarbons, i.e. benzene, toluene, xylene and the like being preferred. Halogenated hydrocarbons such as chloroform, methylene chloride, carbon tetrachloride and the chloroethanes however, may also be used.

Agitation of the system is preferred, however, the degree of agitation is not critical in that the rate of agitation has no effect on the molecular weight or yield of polymer.

Examples of triazines which may be used to produce our novel thermoplastic resins and which are represented by Formula I include:

2,4-dibromo-6-methoxy-s-triazine,
2,4-dichloro-6-methyl-s-triazine,
2,4-dibromo-6-methoxy-s-triazine,
2,4-dibromo-6-n-butyl-s-triazine,
2,4-diiodo-6-methoxy-s-triazine,
2,4-diiodo-6-ethoxy-s-triazine,
2,4-dichloro-6-(1-naphthyl)-s-triazine,
2,4-dichloro-6-n-butoxy-s-triazine,
2,4-dibromo-6-n-butoxy-s-triazine,
2,4-diiodo-6-n-butoxy-s-triazine,
2,4-dichloro-6-allyloxy-s-triazine,
2,4-dichloro-6-phenyl-s-triazine, 2,4-dichloro-6-phenoxy-s-triazine,
2,4-dichloro-6-(1-naphthoxy)-s-triazine,
and the like.

Examples of diamines which are represented by Formula II and are therefore useful to produce our novel resins include ethylenediamine,
p,p'-phenylenediamine,
p-xylylenediamine,
tetramethylenediamine,
hexamethylenediamine,
1,9-nonanediamine,
diaminoneopentane,
N-methylethylenediamine,
N,N'-dibutylethylenediamine,
N-butyl-1,4-butanediamine,
N,N'-dimethylethylenediamine,
N-ethylethylenediamine,
N,N'-diethylethylenediamine,
N,N'-dimethyl-1,3-propanediamine,
N,N'-dimethyl-2-butene-1,4-diamine
and the like.

THE NOVEL POLYMERS

The novel polymers of our invention are crystalline solids and have weight average molecular weights ranging form about 85,000 to about 100,000 as determined by the light scattering method more fully described and set forth by Flory, Principles of Polymer Chemistry, Ch. VII, Cornell University Press, 1953.

The polymers can be represented by the structural formula (III)

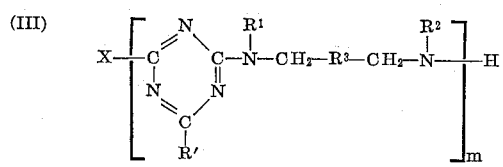

wherein X, R', $R^2$ and $R^3$ are as defined above in regard to Formulae I and II, $R^4$ is an alkoxy ($C_1$–$C_4$), aryloxy ($C_6$–$C_{10}$) or allyloxy radical and $m$ is the number of recurring units in the polymer.

The polymers are soluble in such solvents as formic acid, sulfuric acid, and hydroxy aromatics such as phenol, cresol, resorcinol, etc., and are insoluble in all the common organic solvents, i.e. aliphatic alcohols, ethers, ketones, aldehydes, etc. They may be converted into thermoset materials by heating to cross-link the product through, e.g., alkoxy-alkoxy or alkoxy-terminal halogen linkages. Furthermore, they may be alkylolated by reacting them with e.g. formaldehyde, under known reaction conditions and subsequently cured by application of heat with or without a catalyst.

Additives such as fillers, dyes, pigments, stabilizers, plasticizers, ultraviolet absorbers and the like may be added to our novel molding resins without detracting from the scope of the present invention.

The following examples are set forth for purposes of illustration only and are not to be construed as limitations on the present invention except as set forth in the appended claims. All parts and percentages are by weight unless otherwise specified.

Example 1

Materials:
(1) 2,4-dichloro-6-methoxy-1,3,5-triazine (9.0 parts)
(2) Toluene (500 parts)
(3) Hexamethylenediamine (5.8 parts)
(4) Water (125 parts)
(5) NaOH (4.8 parts)

A clear solution of (1) and (2) is placed in a suitable reaction vessel equipped with an addition funnel, thermometer, stirring shaft and water condenser. The solution is heated to 86° C. and a clear solution of (3), (4) and (5) is added dropwise over 30 minutes with strong agitation at reflux temperature (86° C.). The reaction is continued an additional 250 minutes. A white precipitate develops and the precipitated white powdery polymer is withdrawn, filtered, washed with water and acetone and dried in vacuo at room temperature to constant weight. The yield is 85%. The softening point, measured on a Fisher-Johns Block, is 160° C.

Table I shows the gradual molecular weight increase which takes place as the reaction proceeds. The reduced viscosities are determined at 0.5% concentrations in 1 N sodium formate in 90% formic acid at 30° C. using an Ostwald viscometer.

TABLE I

| Total Reaction time (hrs.): | η Red |
|---|---|
| 0.75 | 0.46 |
| 1.25 | 0.82 |
| 2.25 | 0.92 |
| 5.00 | 1.0 |

Example 2

Example 1 is repeated, only the reaction is run at 70° C. The yield of polymer is 78% and the softening point is 150° C. The increase in the reduced viscosity of the polymer as the reaction proceeds is shown in Table II.

TABLE II

| Reaction time (hrs.): | η Red [1] |
|---|---|
| 0.75 | 0.24 |
| 2.25 | 0.44 |
| 3.75 | 0.52 |
| 21.75 | 0.64 |
| 27.25 | 0.76 |
| 45.75 | 0.80 |
| 72.00 | 0.80 |

[1] Measured in 1 N NaOOCH in 90% HCOOH at 0.5% concentration, 30° C.

Examples 3–8

Following the procedure of Example 1, several linear polymers are prepared from 2,4-dichloro-6-methoxy-1,3,5-triazine and various primary aliphatic diamines of the formula $H_2N(CH_2)_mNH_2$. The softening points and reduced viscosities of the resultant polymers are shown in Table III. In these preparations, .05 mol of the diamine is used.

TABLE III

| Ex. | m | η Red [1] | Softening Point, °C. | Yield, Percent | D-Spacings |
|---|---|---|---|---|---|
| 3 | 2 | [2] 0.06 | [3] | 62 | 13.0; 6.46; 5.40; 3.72; 2.82 |
| 4 | 3 | 0.075 | [3] | 43 | 7.96; 5.06; 4.17; 3.72; 3.30; 2.89 |
| 5 | 4 | 0.14 | 170 | 66 | 8.93; 6.10; 4.41; 4.00; 3.67 |
| 6 | 6 | 0.25 | 140 | 66 | 11.2; 4.95; 4.09; 3.54; 2.97 |
| 7 | 7 | 0.26 | 125 | 66 | |
| 8 | 9 | [2] 0.54 | 110 | 82 | 14.2; 4.79; 4.23; 3.90; 3.26; 2.85 |

[1] Measured in 1 N NaOOCH in 90% HCOOH at 0.5% concentration, 30° C.
[2] Intrinsic viscosity in 0.5 N NaOOCH in 90% HCOOH, 30° C.
[3] Does not soften to 300° C.

Examples 9–16

Several linear polymers are prepared according to the method outlined in Example 1 from hexamethylenediamine and various 2,4-dichloro-6-R-1,3,5-triazines. The softening points and reduced viscosities are shown in Table IV below.

TABLE IV

| Ex. | R | Softening Point, °C. | η Red | M.P., °C. | Yield, Percent | D-Spacings |
|---|---|---|---|---|---|---|
| 9 | Allyloxy | 105 | 0.26 | | 82 | |
| 10 | n-Butyloxy | 125 | 0.24 | 250 | 71 | 16.4; 11.2; 6.28; 5.57; 5.18; 4.41; 4.17; 3.29 3.14; 2.84 |
| 11 | Naphthyl | 120 | 0.13 | 205 | 67 | |
| 12 | Phenyl | 130 | 0.41 | 260 | 77 | 11.9; 7.60; 6.70; 5.82; 4.37; 4.04; 3.75; 3.42; 3.21; 2.94; 2.79 |
| 13 | Phenoxy | 120 | 0.12 | 200 | 59 | 11.3; 6.75; 5.21; 4.69; 4.19; 3.72; 2.99; 2.49 |
| 14 | Methyl | 130 | 0.21 | 240 | 83 | |
| 15 | n-Butyl | 125 | 0.19 | 205 | 79 | |
| 16 | 1-naphthyloxy | 115 | 0.26 | 190 | 61 | |

*Examples 17–23*

Following the procedure of Example 1, 2,4-dichloro-6-methoxy-s-triazine is reacted with various diamines having the formula $R^1$—NH—$(CH_2)_y$—NH—$R^2$. The results are set forth below in Table V.

TABLE V

| Ex. | $R^1$ | $R^2$ | y | Contact Time, Hr. | Temp., °C. | η Red [1] | SP,[2] °C. |
|---|---|---|---|---|---|---|---|
| 17 | CH₃ | H | 2 | 17 | 65 | 0.14 | 180 |
| 18 | CH₃ | CH₃ | 2 | 18 | 95 | 0.08 | 145 |
| 19 | C₂H₅ | H | 2 | 20 | 86 | 0.22 | 145 |
| 20 | C₂H₅ | C₂H₅ | 2 | 20 | 86 | 0.08 | 75 |
| 21 | CH₃ | CH₃ | 3 | 17 | 86 | 0.04 | 175 |
| 22 | CH₃ | CH₃ | 4 | 20 | 86 | 0.06 | 125 |

[1] Measured in Na formate in 98% formic acid, 0.5% concentration, 30° C.
[2] Measured on Fisher-John Block.

*Examples 24–28*

Following the procedure of Example 1, 2,4-dichloro-6-methoxy-s-triazine and hexamethylene diamine are reacted via prior art solution and bulk methods. The results and comparisons to our interfacial process are set forth hereinbelow in Table VI.

TABLE VI

| Ex. | Process | Solvent | Contact Time | Temp., C. | η Red [1] | Yield, percent |
|---|---|---|---|---|---|---|
| 24 | Solution | Benzene | 22 | 70 | 0.15 | 41 |
| 25 | Interfacial | do | 22 | 70 | 0.63 | 92 |
| 26 | Solution | Acetone | 19 | 30 | 0.06 | 7 |
| 27 | Interfacial | Toluene | 19 | 26 | 0.12 | 93 |
| 28 | Bulk | | 19 | 70 | Insol. | 15 |

[1] Measured in Na formate in 98% formic acid, 0.5% concentration, 30° C.

*Examples 29–32*

Following the procedure of Example 1, the same two monomers are reacted in varying concentrations. The results are set forth in Table VII, below.

TABLE VII

| Ex. | Molar Ratio Triazine: Diamine | Conc. Reactants | | Reaction Time, Hr. | Yield | η Red [1] |
|---|---|---|---|---|---|---|
| | | Triazine, M | Diamine, M | | | |
| 29 | 1:1 | 0.1 | 0.4 | 0.75 | 66 | 25 |
| 30 | 1:2 | 0.1 | 0.4 | 0.75 | 88 | 24 |
| 31 | 1:5 | 0.1 | 0.4 | 0.75 | 87 | 22 |
| 32 | 2:1 | 0.1 | 0.4 | 0.75 | 10 | 0.06 |

[1] Measured in Na formate in 98% formic acid, 0.5% concentration, 30° C.

Examples 33-39

Again following the procedure of Example 1, various triazines are reacted with various diamines according to our invention. The results of these reactions are set forth below in Table VIII.

TABLE VIII

| Ex. | Triazine | | Diamine | | | Temp., °C. | Time, Hrs. | Softening Point,[1] °C. | η Red [2] | Yield, percent |
|---|---|---|---|---|---|---|---|---|---|---|
| | R | X | R[1] | R[2] | R[3] | | | | | |
| 33 | Methoxy | Br | H | n-Butyl | $-\underset{CH_3}{\underset{\|}{\overset{CH_3}{\overset{\|}{C}}}}-$ | 86 | 14 | 125 | 0.12 | 75 |
| 34 | Allyloxy | I | n-Propyl | n-Propyl | $-CH=CH_2$ | 86 | 10 | 70 | 0.06 | 80 |
| 35 | Tolyloxy | I | H | H | ⟨phenyl⟩ | 70 | 25 | 195 | 0.21 | 68 |
| 36 | Phenoxy | Br | n-Butyl | n-Butyl | $-CH_2-$⟨phenyl⟩$-CH_2-$ | 70 | 0.75 | 110 | 0.09 | 41 |
| 37 | Ethyl | Cl | H | Methyl | $-(CH_2)_5CH=CH-$ | 23 | 50 | 110 | 0.17 | 59 |
| 38 | Xylyl | Br | Methyl | do | ⟨naphthyl⟩ | 70 | 20 | 120 | 0.13 | 71 |
| 39 | 1-naphthyloxy | I | Ethyl | do | $-\underset{C_2H_5}{\underset{\|}{\overset{C_2H_5}{\overset{\|}{C}}}}-$ | 86 | 20 | 160 | 0.16 | 74 |

[1] Measured in NA formate in 98% formic acid, 0.5% concentration, 30° C.
[2] Measured on Fisher-John Block.

Example 40

The polymers described in preceding Examples 1 to 39 can be cross-linked by heating them at elevated temperatures (150-200° C.). The cross-linking reaction involves the condensation of terminal halide atoms with the function in the 6-position of the triazine ring. This is determined by analysis of the volatile components upon prolonged heating of the polymer. For instance, upon heating poly(2,4-hexamethylenediamino-6-methoxy-1,3,5-triazine) at 150° C. in vacuo for one hour, the polymer becomes insoluble and analysis by vapor phase chromatography and mass spectroscopy shows the volatiles to contain 95% methyl chloride.

We claim:

1. A method for the production of a linear, thermoplastic molding resin which comprises interfacially condensing a solution of (1) a compound having the formula

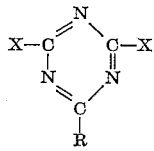

wherein X is selected from the group consisting of bromine, chlorine and iodine and R is selected from the group consisting of an alkyl ($C_1-C_4$), an alkoxy ($C_1-C_4$), an aryl ($C_6-C_{10}$), an aryloxy ($C_6-C_{10}$) and an allyloxy radical, with an aqueous solution of (2) a diamine having the formula

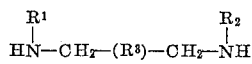

wherein R[1] and R[2] are individually selected from the group consisting of hydrogen and an alkyl ($C_1-C_4$) radical and R[3] is selected from the group consisting of an alkenylene ($C_2-C_7$), an arylene ($C_6-C_{10}$), an alkylidene ($C_3-C_5$) radical and a $(CH_2)_n$ group wherein n is a whole positive integer of from 0 to 7, at a temperature ranging from about 0° C. to about 100° C., the molar ratio of (1) to (2) being from about 1:1 to about 1:5, respectively.

2. A method according to claim 1 wherein X is chlorine and R is an alkoxy ($C_1-C_4$) radical.

3. A method according to claim 1 wherein R[1] and R[2] are hydrogen and R[3] is a $(CH_2)_4$ group.

4. A method according to claim 1 wherein (1) is 2,4-dichloro-6-methoxy-s-triazine and (2) is hexamethylenediamine.

5. A linear, thermoplastic molding resin having the structural formula

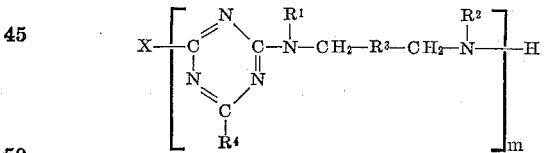

wherein X is selected from the group consisting of bromine, chlorine and iodine, R[4] is selected from the group consisting of alkoxy ($C_1-C_4$), aryloxy ($C_6-C_{10}$) and allyloxy radicals, R[1] and R[2] are individually selected from the group consisting of hydrogen and an alkyl ($C_1-C_4$) radical, R[3] is selected from the group consisting of alkenylene ($C_2-C_7$), arylene ($C_6-C_{10}$), alkylidene ($C_3-C_5$) radicals and a $(CH_2)_n$ group wherein n is a whole positive integer of from 0 to 7 and m is the number of recurring units in the resin.

6. A linear, thermoplastic molding resin according to claim 5 wherein X is chlorine, R is an alkoxy ($C_1-C_4$) radical, R[1] and R[2] are hydrogen and R[3] is a $(CH_2)_4$ group.

References Cited by the Examiner

UNITED STATES PATENTS

| 2,723,244 | 11/1955 | Joyce et al. | 260—2 |
| 2,824,088 | 2/1958 | Neher | 260—2 |
| 2,884,383 | 4/1959 | Grundmann et al. | 260—2 |
| 3,155,628 | 11/1964 | Bloomfield | 260—2 |

OTHER REFERENCES

Morgan, "SPE Journal," June 1959, pp. 485-495.

SAMUEL H. BLECH, *Primary Examiner*.